(12) United States Patent
Shinkai et al.

(10) Patent No.: US 8,034,426 B2
(45) Date of Patent: Oct. 11, 2011

(54) TWO-LAYERED OPTICAL RECORDING MEDIUM

(75) Inventors: Masaru Shinkai, Yokohama (JP); Michiaki Shinotsuka, Hiratsuka (JP); Hiroyoshi Sekiguchi, Yokohama (JP); Masaki Kato, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 500 days.

(21) Appl. No.: 11/883,122

(22) PCT Filed: Mar. 16, 2006

(86) PCT No.: PCT/JP2006/305763
§ 371 (c)(1),
(2), (4) Date: Jul. 26, 2007

(87) PCT Pub. No.: WO2006/098503
PCT Pub. Date: Sep. 21, 2006

(65) Prior Publication Data
US 2008/0305293 A1      Dec. 11, 2008

(30) Foreign Application Priority Data
Mar. 17, 2005    (JP) .................................. 2005-077886

(51) Int. Cl.
*B32B 3/02* (2006.01)
(52) U.S. Cl. ..................... 428/64.1; 428/64.4; 428/64.5; 428/64.6; 430/270.13
(58) Field of Classification Search .......... None
See application file for complete search history.

(56) References Cited

U.S. PATENT DOCUMENTS

| 6,881,466 B2 * | 4/2005 | Kojima et al. ............... 428/64.1 |
| 7,045,187 B2 * | 5/2006 | Nee ............................... 428/64.1 |
| 2005/0226128 A1 | 10/2005 | Van Schijndel et al. |

FOREIGN PATENT DOCUMENTS

| JP | 04049539 | * 2/1992 |
| JP | 5-303781 | 11/1993 |
| JP | 8-32482 | 3/1996 |
| JP | 2692654 | 9/1997 |
| JP | 10-116441 | 5/1998 |
| JP | 3087433 | 7/2000 |

(Continued)

OTHER PUBLICATIONS

European search report in connection with a counterpart European patent application No. 06 72 9730.

(Continued)

*Primary Examiner* — Elizabeth Mulvaney
(74) *Attorney, Agent, or Firm* — Cooper & Dunham LLP

(57) ABSTRACT

A two-layered optical recording medium which includes a first substrate, a first information layer, a second information layer, and a second substrate formed in this order as viewed from the light beam irradiation side, the first information layer includes a first lower dielectric layer, a first recording layer, a first upper dielectric layer, a first reflective layer, and an inorganic dielectric layer formed in this order as viewed from the light beam irradiation side; the second information layer includes a second lower dielectric layer, a second recording layer, a second upper dielectric layer, and a second reflective layer formed in this order as viewed from the light beam irradiation side; and the first reflective layer is made of Cu with a content of 99.8% by mass to 95.0% by mass and one or more metals selected from Ta, Nb, Zr, Ni, Cr, Ge, Au, and Mo.

19 Claims, 6 Drawing Sheets

FOREIGN PATENT DOCUMENTS

| | | |
|---|---|---|
| JP | 2000-215516 | 8/2000 |
| JP | 2001-143322 | 5/2001 |
| JP | 3216794 | 8/2001 |
| JP | 2002-25115 | 1/2002 |
| JP | 2002-123977 | 4/2002 |
| JP | 2002-140838 | 5/2002 |
| JP | 2002-144736 | 5/2002 |
| JP | 2002-288876 | 10/2002 |
| JP | 2002-293025 | 10/2002 |
| JP | 2003-16687 | 1/2003 |
| JP | 2003-338081 | 11/2003 |
| JP | 2004-39146 | 2/2004 |
| JP | 2004-110911 | 4/2004 |
| JP | 2005-50497 | 2/2005 |
| JP | 2005/050497 | * 2/2005 |
| JP | 2005/524922 | 8/2005 |
| WO | WO02/21524 A1 | 3/2002 |
| WO | WO03/094160 A1 | 11/2003 |
| WO | WO2004/042717 A1 | 5/2004 |

OTHER PUBLICATIONS

Uno, Mayaumi and Noboru Yamada, "Acceleration of crystallization process by nitride interface layer" *New Technologies for Phase-Change Optical Recording,* Nov. 26-27, 1998, pp. 85-90, 10th Symposium, Japan.

* cited by examiner

TWO-LAYERED OPTICAL RECORDING MEDIUM

TECHNICAL FIELD

The present invention relates to a two-layered optical recording medium capable of exhibiting excellent recording properties in a wavelength range of 453 nm or more, particularly in infrared laser wavelengths of 655 nm±5 nm.

BACKGROUND ART

Optical discs such as CD-R (Compact Disc-Recordable) and CD-RW (Compact Disc-Rewritable) typically has a laminar structure in which signals such as sounds, letters and/or images are recorded circumferentially on a discoidal substrate made of plastic such as polycarbonate or the like or a recording layer formed on the discoidal substrate, and a reflective layer is formed on the surface of the substrate or the recording layer by vapor deposition or sputtering using metal such as aluminum, gold or silver. In this case, signals are recorded or reproduced by irradiating the optical disc with a laser beam from the substrate surface side.

Recently, signal recording capacity of optical discs is significantly increased, and signal information is more highly densified as can be seen in DVD+RW, DVD-RW, DVD-RAM, because information volumes handled by use of computer memory, memory for images and sound clips, optical cards, and the like have remarkably increased. Presently, CD has a recording capacity of around 650 MB, and DVD has a recording capacity of around 4.7 GB, however, further high-densification of recording is demanded. As a way to enhance recording density in optical systems, shortening wavelengths of a semiconductor laser beam source for use and increasing numerical aperture (NA) of object lens for use are studied. Further, not only enhancement of recording density in a two-dimensional direction but also a technique of which the number of recording layers is multiplied in a thickness direction of the recording medium to store recorded information are studied.

As a means to obtain a high-capacity optical recording medium, when multiple recording layers are formed in a direction of laser beam irradiation and a laser beam with blue wavelengths is used, it brings about the following problems.

For example, in the case of an optical recording medium having two recording layers, in order to enhance the amount of light incident on a second recording layer disposed at the innermost side as viewed from the light beam irradiation side and in order to enhance the transmittance of the returned beams of light, the transmittance of light beam incident on a first recording layer disposed at the light beam irradiation side needs to be assured. To assure the light transmittance property, it is important to select materials and thicknesses of layers that are subjected to light absorption. Particularly, selecting materials of recording layers becomes an important issue. Patent Literature 1 discloses that when the thicknesses of recording layers are made thin to reduce the light absorption, the crystallization rate tends to be relatively lowered. Patent Literature 2 discloses a means to enhance the crystallization rate and employs a means to enhance the crystallization rate of a recording-layer material itself. The method for enhancing the crystallization rate of a recording-layer material itself is disclosed in Patent Literature 3. When the thickness of a recording layer is made ultrathin, the transmittance of the light beam is increased, however, the power of light beam to be absorbed at the first recording layer is reduced by the amount of transmitted light beam, and differences in recording signals being sufficient enough to read the signals are hardly obtainable. As mentioned above, there are technological difficulties in achievement of multi-layered optical recording medium.

By the way, from the perspective of materials of recording layers, there are two mainstreams of developments in the materials. Namely, one of the mainstreams is developments in GeTe which is a material used for recordable recording layers, inducing phase-changes on recording layers, and recording layer materials made of a ternary alloy of GeSbTe from a solid solution or a eutectic composition of the above-noted two recording layer materials. The other mainstream is developments in alloys of Sb and Te similarly to the above, however, this is a recording layer material made of a eutectic composition of Sb and $Sb_2Te_3$, and microelements are added to SbTe with a Sb content of around 70%.

As for the ternary alloy materials, Patent Literature 4 to 8 disclose that an addition of Ge to the main component of Te enabling reversible phase-changes can stabilize amorphous phase of Te, further, mixing $Sb_2Te_3$ with the above materials can reduce the optical energy required for recording, and by determining the mixture ratio within an optimum range, information can be recorded, erased, and rewritably recorded at high-linear velocities. Among the above mentioned documents, Patent Literature 5, 6, and 8 respectively disclose an optical recording medium having multiple recording layers.

As for the latter recording layer material of SbTe alloy, Patent Literature 9 discloses an example of a phase-change recording material of which Sb and Te are employed as the main component, and the atomic ratio satisfies the condition of $2.3 < Sb/Te \leq 4.0$. The invention describes that since the phase-change recording material has a high-crystallization rate, it enables recording, reproducing, and rewriting at high-transmission rate with stability.

However, with recording materials which are made of a compound existing on an extended line of GeTe and/or $Sb_2Te_3$, which are shown in Patent Literature 5, 6, and 8 stated above, each of the elements has a high-melting point and a high-crystallization temperature, and thus the rewriting speed is not sufficiently fast. In order to improve the recording linear velocity, a laminar structure in which a crystallization supporting layer made of a metal alloy is formed on and under a recording layer just like in Patent Literature 10, and a laminar structure in which an interface layer made of GeN or the like have been generally used. Interface layers made of GeN or the like are disclosed in Patent Literature 2 and Non-Patent Literature 1. The layers used for improving recording linear velocity in the documents can be said as a negative factor for first recording layers for which light transmittance property is required, because the layers absorb not a little amount of light. Thus, for materials of a first recording layer, a material that enables recording without a high-power, and forming with a simple laminar structure is desired. Further, since compounds existing on an extended line of GeTe and/or $Sb_2Te_3$ respectively have a low C/N ratio (Carrier to Noise Ratio) of 30 dB, it is disadvantageous in that a stable system is hardly structured when rewritable optical disc system which is said to require at least 45 dB is structured.

Next, as reflective layers of optical recording media, metal or alloy is used. For example, as disclosed in Patent Literature 11, Ag or Ag alloy is often used for reflective layers. For the reason, Ag or Ag alloy is excellent in thermal conductivity and in light reflection property. However, Ag monomers have a problem with the storage stability, and there is a need to additionally form a barrier layer or an intermediate layer for preventing Ag from reacting with other substances. Since carbide or metal is used for materials of barrier layers or intermediate layers, absorption of optical energy by a reflective layer, a barrier layer and an intermediate layer disadvantageously affects a laminar structure having multiple recording layers in terms of effective utilization of optical energy.

As for inventive examples relating to materials of Ag reflective layers, there are proposals of improving the trade-off relationship between durability and reflectance of Ag reflective layers by use of additives to assure the durability and reflectance, besides the use of Ag alloy (see Patent Literature 12).

As for examples relating to materials of reflective layers other than Ag or Ag alloy, there are reflective layers using Cu (see Patent Literature 13 to 16), and using Au (see Patent Literature 17).

However, Patent Literature 14 stated above relates to reproducing only ROM (Read Only Memory) media and is unrelated to recordable optical recording media. Patent Literature 15 stated above employs Cu for the reflective layer, however, only AgPdCu alloy is shown in the examples, and there is no specific description on a reflective layer using Cu as the main component. In addition, Patent Literature 16 describes that Cu is used as the main component for the reflective layer, however, in fact, the invention discloses a reflective layer made of Ag as the main component, and there is no specific description on Cu.

In addition, Patent Literature 18 discloses an optical recording medium having multi-layered recording layers and described that Cu is mainly used for the metallic reflective layer, and the metallic reflective layer has a thickness of 2 nm to 10 nm, however, in fact, there are only examples of reflective layers using only Cu in the examples of the invention, and there is no description on employment of other additional components for the metallic reflective layer. In the examples, it is disclosed that the storage reliability can be ensured with only the use of Cu, without the necessity of using other additional components. According to our findings, however, the storage property with a single use of Cu turned out to be degraded. Further, it turned out that even when other additional components are added, it is ineffective in keeping the storage property high depending on the type of components to be added.

Patent Literature 1 Japanese Patent Application Laid-Open (JP-A) No. 2002-144736
Patent Literature 2 Japanese Patent Application Laid-Open (JP-A) No. 2002-293025
Patent Literature 3 Japanese Patent Application Laid-Open (JP-A) No. 2003-16687
Patent Literature 4 Japanese Patent (JP-B) No. 2692654
Patent Literature 5 Japanese Patent (JP-B) No. 3216794
Patent Literature 6 Japanese Patent Application Laid-Open (JP-A) No. 10-116441
Patent Literature 7 Japanese Patent Application Publication (JP-B) No. 08-032482
Patent Literature 8 Japanese Patent Application Laid-Open (JP-A) No. 2001-143322
Patent Literature 9 Japanese Patent Application Laid-Open (JP-A) No. 2002-288876
Patent Literature 10 Japanese Patent Application Laid-Open (JP-A) No. 2002-123977
Patent Literature 11 Japanese Patent Application Laid-Open (JP-A) No. 2002-140838
Patent Literature 12 Japanese Patent Application Laid-Open (JP-A) No. 2004-39146
Patent Literature 13 International Publications No. WO/02/021524
Patent Literature 14 Japanese Patent Application Laid-Open (JP-A) No. 2003 331381 2003-338081
Patent Literature 15 Japanese Patent Application Laid-Open (JP-A) No. 2000-215516
Patent Literature 16 Japanese Patent Application Laid-Open (JP-A) No. 2002-25115
Patent Literature 17 Japanese Patent (JP-B) No. 3087433
Patent Literature 18 Japanese Patent Application Laid-Open (JP-A) No. 2005-524922
Non-Patent Literature 1 On pp. 85-90, collected lecture papers of The $10^{th}$ Symposium on Phase Change Optical information Storage (1998)

SUMMARY

It is therefore an object of the present invention to provide. In an aspect of this disclosure, there is provided a two-layered optical recording medium having two information layers by which sufficient recording property can be obtained even at the information layer having high-light transmittance property disposed at the front side as viewed from the light beam irradiation side in a wavelength range of 453 nm or more, particularly in infrared wavelengths of 655 nm±5 nm being used for DVD, and recording and reproducing of data signals are also assuredly possible from the information layer disposed at the innermost side thereof.

The following are some additional aspects of this disclosure.

<1> A two-layered optical recording medium including a first substrate, a first information layer, a second information layer, and a second substrate formed in this order as viewed from the light beam irradiation side, wherein the first information layer is provided with a first lower dielectric layer, a first recording layer, a first upper dielectric layer, a first reflective layer, and an inorganic dielectric layer formed in this order as viewed from the light beam irradiation side; the second information layer is provided with a second lower dielectric layer, a second recording layer, a second upper dielectric layer, and a second reflective layer formed in this order as viewed from the light beam irradiation side; and the first reflective layer contains Cu with a content of 99.8% by mass to 95.0% by mass and one or more metals selected from the group consisting of Ta, Nb, Zr, Ni, Cr, Ge, Au, and Mo and has a thickness of 4 nm to 12 nm.

<2> The two-layered optical recording medium according to item <1>, wherein the first information layer and the second information layer are disposed in a laminar structure at an interval where the information layers are optically separatable from each other, and recording can be performed on both of the information layers by means of laser beam irradiation from the same direction.

<3> The two-layered optical recording medium according to any one of items <1> to <2>, wherein the first substrate is transparent.

<4> The two-layered optical recording medium according to any one of items <1> to <3>, wherein the first reflective layer comprises Cu with a content of 99.8% by mass to 97.0% by mass and one or more metals selected from the group consisting of Ta, Nb, Zr, Ni, Cr, Ge, Au, and Mo.

<5> The two-layered optical recording medium according to any one of items <1> to <4>, wherein the first reflective layer has a thickness of 6 nm to 12 nm.

<6> The two-layered optical recording medium according to any one of items <1> to <5>, wherein at least one of the first recording layer and the second recording layer contains a phase-change recording material containing In, Sb, and Ge.

<7> The two-layered optical recording medium according to any one of items <1> to <5>, wherein at least one of the first recording layer and the second recording layer comprises a phase-change recording material containing Sb, Te, and Ge in order of descending content.

<8> The two-layered optical recording medium according to any one of items <6> and <7>, wherein the content of Ge is 3.5 atomic % to 10 atomic %.

<9> The two-layered optical recording medium according to any one of items <1> to <8>, wherein the first recording layer has a thickness of 4 nm to 16 nm.

<10> The two-layered optical recording medium according to any one of items <1> to <9>, wherein the first upper dielectric layer contains a Ta oxide, and a Sn oxide.

<11> The two-layered optical recording medium according to any one of items <1> to <10>, wherein each of the first lower dielectric layer and the second lower dielectric layer contains a mixture of ZnS and $SiO_2$.

<12> The two-layered optical recording medium according to any one of items <1> to <11>, wherein the light beam is a laser beam with a wavelength of 650 nm to 660 nm.

BEST MODE FOR CARRYING OUT THE INVENTION

The two-layered optical recording medium of the present invention has a first information layer and a second information layer formed in the order viewed from the light beam irradiation side between a first substrate and a second substrate and further has other layers in accordance with the necessity.

In this case, it is preferred that the first information layer and the second information layer are formed in a laminar structure at a interval where the first information layer and the second information layer are optically separatable from each other, and recording can be performed on both of the information layers by laser beam irradiation from the same direction.

The first substrate is preferably transparent. Here, being transparent means that the transmittance obtained in a used laser beam wavelength is preferably 85% or more and more preferably 90% or more.

The first information layer is provided with at least a first lower dielectric layer, a first recording layer, a first upper dielectric layer, a first reflective layer, and an inorganic dielectric layer in this order as viewed from the light beam irradiation side and is further provided with other layers in accordance with the necessity.

The second information layer is provided with at least a second lower dielectric layer, a second recording layer, a second upper dielectric layer, and a second reflective layer in this order as viewed from the light beam irradiation side and is further provided with other layers in accordance with the necessity.

Figure 2:
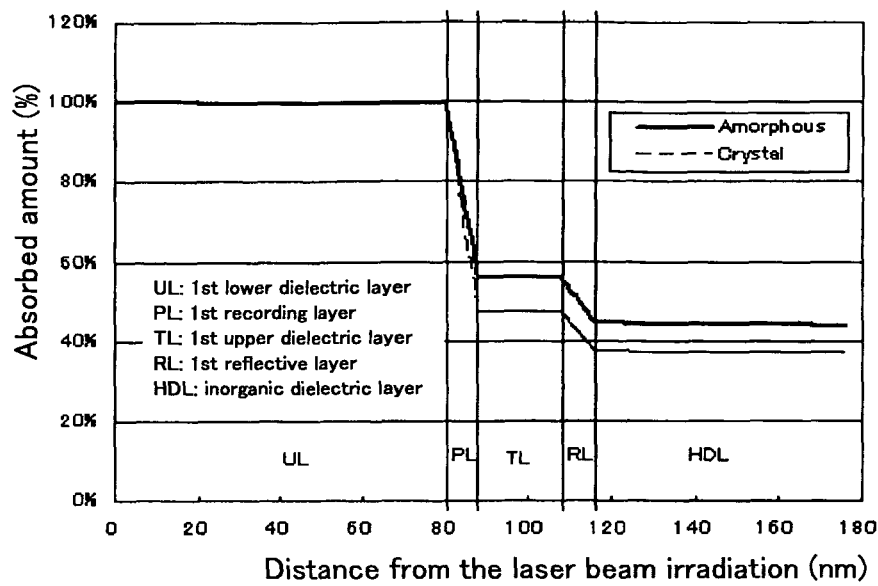
FIG. 2 is a view showing the simulation results of the first recording layer of the two-layered optical recording medium of the present invention.

First, the amount of light absorption at the first information layer was determined by means of simulation (the simulation means used here was produced by MM Research, Inc. and published in MULTILAYER in March 2001 edition). The amount of light absorption was determined in the case where a mixture of ZnS and $SiO_2$ ($ZnS:SiO_2=80:20$ mole %) was used for the first lower dielectric layer, $Ge_5Sb_6Te_9$ (atomic %) was used for the first recording layer, the same mixture of ZnS and $SiO_2$ as in the first lower dielectric layer was used for the first upper dielectric layer, pure Ag was used for the first reflective layer, and $In_2O_3$ was used for the inorganic dielectric layer. FIG. 2 shows the results, and it was confirmed that events of light absorption occurred at the recording layers and the reflective layers. Since the light absorption at recording layers is absolutely imperative, this cannot be eliminated, however, the light absorption at the reflective layers is unrelated to recording and reproducing properties, and a large amount of light absorption at reflective layers brings about only loss of optical energy for recording and reproducing necessary for the second information layer.

Figure 3:
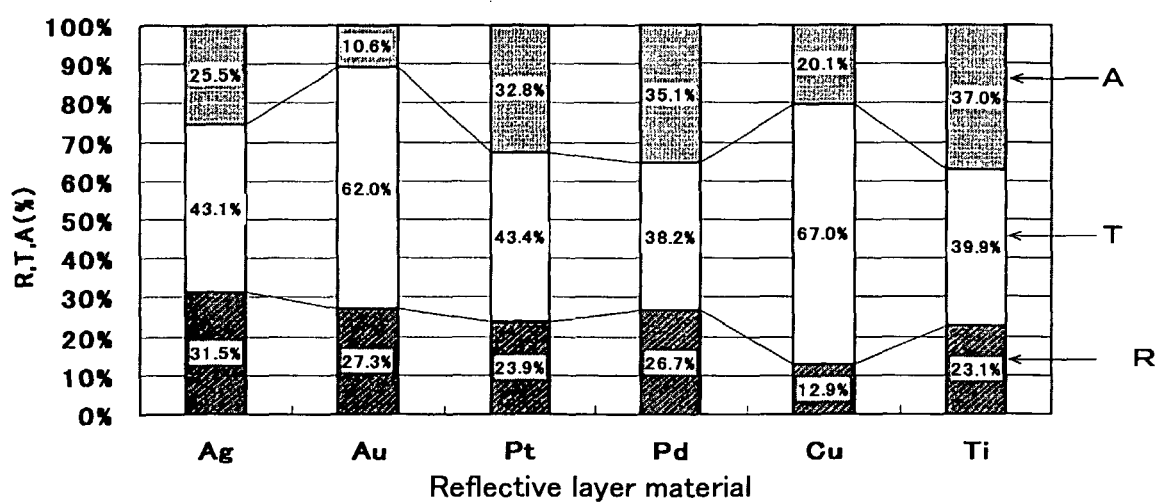
FIG. 3 is a view showing RTA data of various reflective layer materials at a wavelength of 660 nm.

Next, on various metal layers, RTA data (R: reflectance; T: transmission; and A: absorption rate) with a wavelength of 660 nm was measured. As the measurement samples, various metal layers with a thickness of 10 nm formed on a polycarbonate substrate having a thickness of 0.6 mm were used. FIG. 3 shows the measurement results. Based on the measurement results, it is anticipated that Pt, Pd, and Ti are unfavorable for materials of the reflective layer of the first information layer because each of these metal elements has a low transmittance and a high absorption rate.

Figure 4:
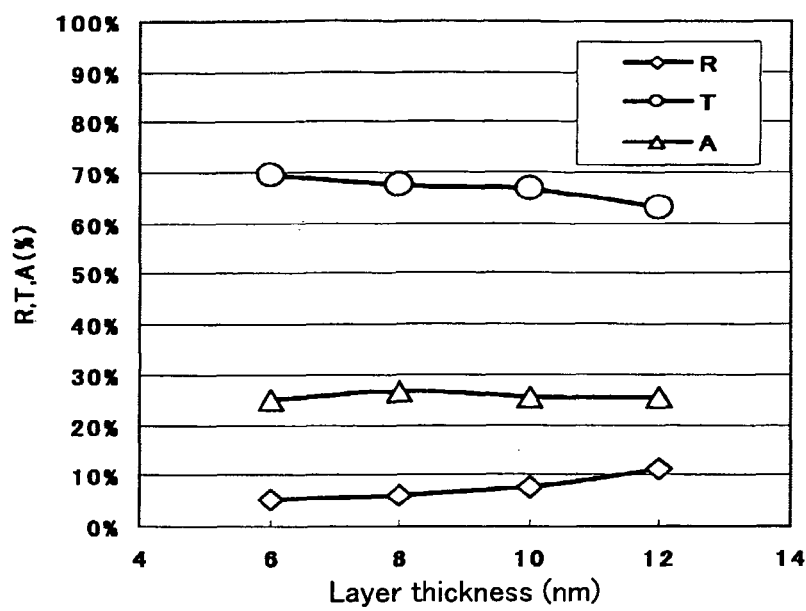
FIG. 4 is a view showing RTA (R: reflectance; T: transmittance; and A: absorption rate) of Cu metal layer used in the present invention.
Figure 5:
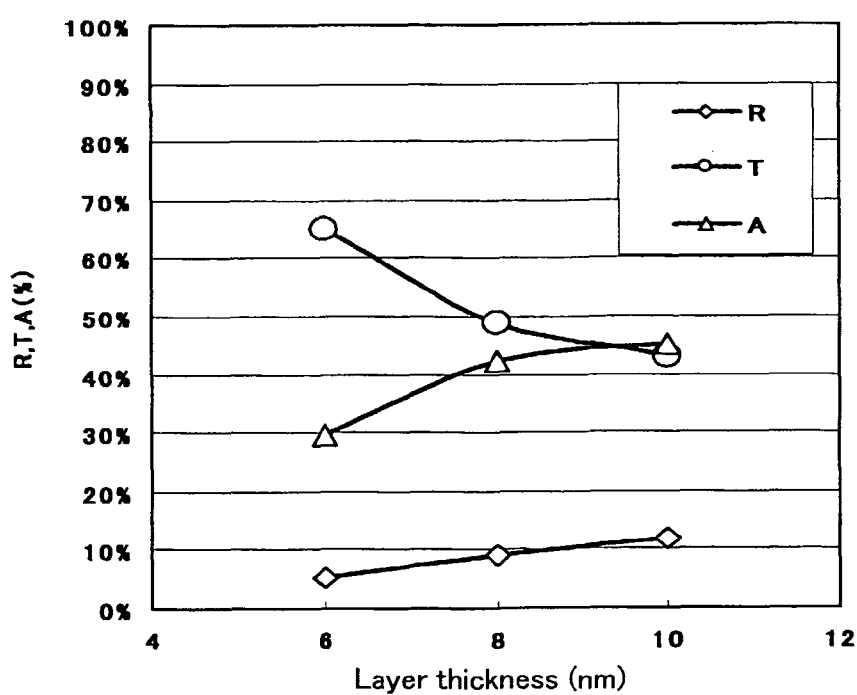
FIG. 5 is a view showing RTA (R: reflectance; T: transmittance; and A: absorption rate) of an Ag alloy metal layer.
Figure 6:
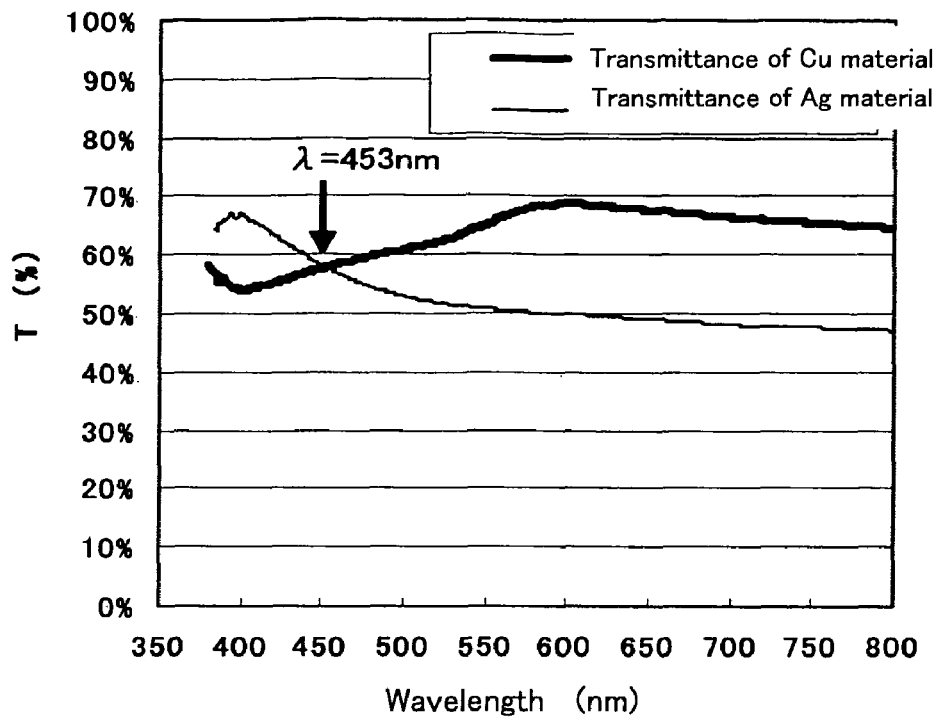
FIG. 6 is a view showing spectral transmittances of an Ag metal layer and a Cu metal layer.
Figure 7:
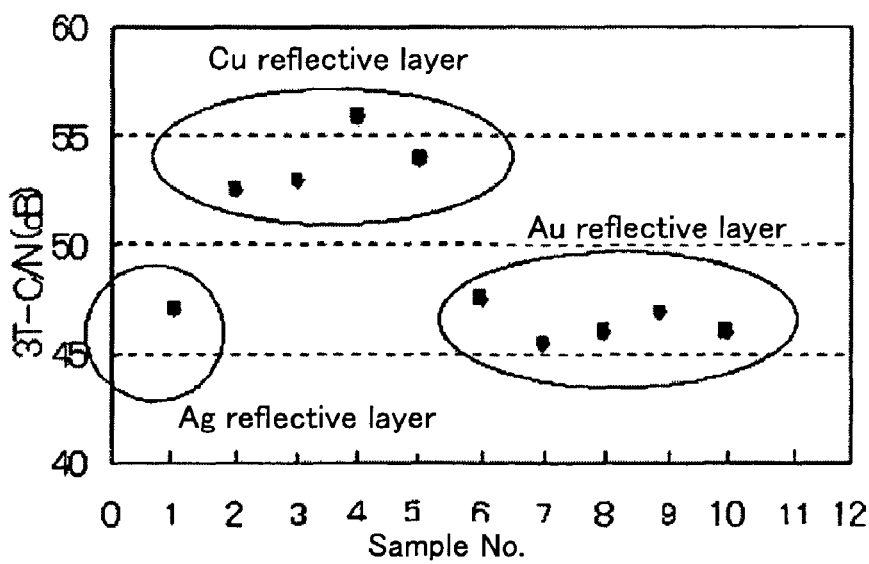
FIG. 7 is a view showing comparison results of C/N ratio among Ag, Au, and Cu.

Next, RTA data (R: reflectance; T: transmission; and A: absorption rate) on Ag, and Cu each having a relatively high transmittance and a low absorption rate were examined at a wavelength of 660 nm with varying the thickness thereof. FIG. 4 and FIG. 5 show the results. The results showed that the Ag layer had a larger variation in RTA depending on the thickness thereof than that of the Cu layer. This shows that Cu is more excellent in process stability than Ag. Further, the measurement results of spectral transmittance of Ag and Cu are shown in FIG. 6. The transmittance of Ag and the transmittance of Cu intersect with each other at a wavelength λ of 453 nm, and it is recognized that Ag is more suitable at wavelengths shorter than 453 nm, however, Cu is more suitable at wavelengths longer than 453 nm. Each C/N ratio of Ag, Cu, and Au based on 3 T recording strategy was measured at a wavelength of 660 nm being used for DVD media. The measurement results as shown in FIG. 7 were obtained. The results showed that a Cu reflective layer is also more suitable in terms of recording and reproducing properties in a wavelength of 660 nm.

For materials of the first reflective layer, to supplement the weakness of pure Cu, a material containing Cu of 99.8% by mass to 95.0% by mass (preferably 99.8% by mass to 97.0% by mass) and a metal additive is used. When the mixture ratio of Cu is more than 99.8% by mass, the effect of the addition of metal cannot be obtained, and a result equivalent to that of pure Cu can only be obtained. Contrarily, when the ratio of Cu is less than 95.0% by mass, adverse effect of the addition of metal is observed, and this consequently inhibits the property of pure Cu i.e. the transmittance property at a wavelength of 660 nm, and the property of C/N ratio that can be obtained at the time of recording signals.

For the metal additive, at least one metal selected from the group consisting of Ta, Nb, Zr, Ni, Cr, Ge, Au, and Mo is used. Each of Ta and Nb has a high-affinity for oxygen and nitrogen and may sometimes be used as getter materials of oxygen and nitrogen. Originally, deterioration of reflective layers is often chemically-caused from oxidation, and particularly, reactants of Cu known as verdigris patina are oxides. With respect to Ta and Nb, they are effective for deterioration of Cu from that point. With respect to Zr, Ni, Cr, Ge, Au, and Mo, by adding one or more of these metal elements to Cu, an alloy of Cu and one or more of these metal elements precipitates on the layer surface at the time of re-crystallization and on crystal grain boundaries of copper, and the precipitation restrains Cu grain boundary diffusion, and this consequently serves to inhibit Cu migration and prevent deterioration of Cu.

Typically, for materials used for reflective layers, metal monomers or semimetal monomers such as Al, Au, Ag, Pt, Cu, Ni, Cr, Ti, and Si or alloys thereof are used. To form recording marks, it is preferable to make a reflective layer have a quenching structure, and thus materials having high-thermal conductivity are used, and Ag or Ag alloy, which has particularly high-thermal conductivity, is often used for reflective layers. For the reason, in addition to high-thermal conductivity, high-reflectance can be obtained with Ag or Ag alloy. However, Ag and Ag alloy are easily sulfurated by contact with sulfide and needs to additionally form an anti-sulfuration barrier layer or an intermediate layer. In the case of the second reflective layer disposed at the innermost side as viewed from the light beam irradiation side, the laminar structure i.e. a laminar structure having an anti-sulfuration barrier layer or an intermediate layer, may be employed, however, in the case of the first reflective layer disposed at the front side as viewed from the light beam irradiation side, the laminar structure is not suitable. Then, the inventors of the present invention focused on Cu, as mentioned above. Table 1 shows thermal conductivity values of some metal materials in bulk condition, and Cu is a material having the highest thermal conductivity next to Ag. Besides the high-thermal conductivity, since Cu has a higher transmittance and a smaller reduction in transmittance with respect to layers compared to other metal elements such as Ag, Cu is suitably used for the reflective layer of an information layer disposed at the front side as viewed from the light beam irradiation side of a tow-layered optical recording medium. Further, with respect to storage stability property, although Cu has a rank order of ionization tendency which is more easily ionized than Ag, Cu hardly migrates to other substances because of the small self-diffusion coefficient, and thus it enables to assure storage reliability by use of a trace amount of additive elements. The added amount of the additive elements is preferably 5% by mass or less, and more preferably 3% by mass or less.

TABLE 1

| Metal material | Thermal Conductivity (W/m K) |
|---|---|
| Al | 240 |
| Au | 313 |
| Ag | 422 |
| Ag alloy | 150-250 |
| Pt | 72 |
| Cu | 395 |
| Ni | 83 |
| Cr | 93.7 |
| Ti | 21.9 |
| Si | 148 |
| Mo | 135 |
| Ta | 58 |

The first reflective layer is required to have a thickness to a degree where recording property values of the first information layer such as on reflectance, C/N ratio (Carrier to Noise Ratio), jitter property can be obtained without any problems and recording can be performed on the second information layer. In other words, the lower limit of the thickness of the first reflective layer is restricted depending on the recording properties of the first information layer, and the upper limit of the thickness is determined depending on the transmittance of the first recording layer. The thickness of the first reflective layer is typically 4 nm to 12 nm, preferably 6 nm to 12 nm, and more preferably 6 nm to 9 nm. When the thickness of the first reflective layer is less than 4 nm, the recording material cannot be sufficiently quenched at the time when recording marks are formed on the recording layer, and amorphous marks cannot be properly formed, therefore, it may be difficult to obtain favorable jitter property. When the thickness is more than 12 nm, the transmittance of the laser beam applied to the second information layer is reduced, and thus the recording property of the second recording layer in the second information layer degrades, for example, the recording power of the second information layer may be increased, and the reflectance may be lowered, although favorable jitter property can be obtained when recording marks are formed on the first recording layer in the first information layer.

The second reflective layer is allowed to have a thickness only to a degree where recording properties can be obtained, since the second reflective layer is not required to have light transmittance property, unlike the first reflective layer, and thus the second reflective layer may be thickly formed to a degree where the second substrate is not deformed. The thickness of the second reflective layer is preferably 100 nm to 140 nm.

From the perspective of materials of recording layers, there are two mainstreams of developments in the materials, as mentioned above. In a two-layered optical recording medium, an information layer disposed at the front side as viewed from the light beam irradiation side i.e. a first information layer is required to have a high-transmittance for the sake of recording and reproducing information on a recording layer disposed at the innermost side (second recording layer), and thus in parallel with the effort to reduce the absorption rate of the first reflective layer, the recording layer disposed at the front side as viewed from the light beam irradiation side (the first recording layer) is required to be made further thin. It is known that the thinner a recording layer, the slower the crystallization rate. Thus, it is advantageous to use a recording layer showing a high-crystallization rate in the first information layer. Then, among the above-mentioned two mainstreams of materials used for recording layers, the latter material i.e. a material having a SbTe eutectic composition with a Sb content of around 70% is more preferably used.

Figure 8:
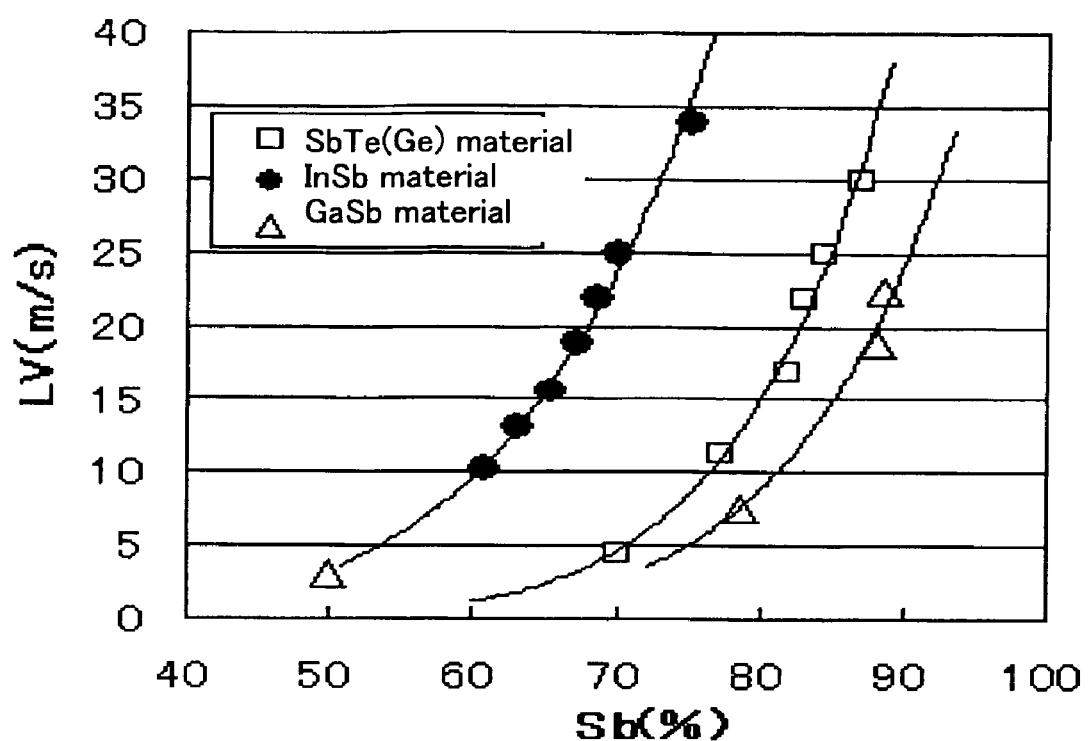
FIG. 8 is a view showing comparison results of recording linear velocities measured with three types of recording layers in single layer optical recording media.

However, it was found that when an amount of Sb content is increased in order to accelerate the crystallization rate, namely, in order to accelerate recording linear velocities, the storage property degrades in accordance with decrease in the crystallization temperature. Then, inventors of the present invention studied and examined materials capable of exhibiting high-crystallization rates with a small amount of Sb content, namely, materials capable of being compatible with high-recording linear velocities. In the result, it was found that InSb materials enable improvements in recording linear velocity with a small amount of Sb content. Thus, for the material used for the first recording layer which is required to be made thin, it is preferable to use InSb materials. FIG. 8 shows compared results of recording linear velocities that InSb, SbTe, and GaSb are respectively compatible with. Among InSb materials, InSbGe is particularly preferable. The results shown in FIG. 8 are evaluation results when the information layer was formed in a single layer.

Figure 10:
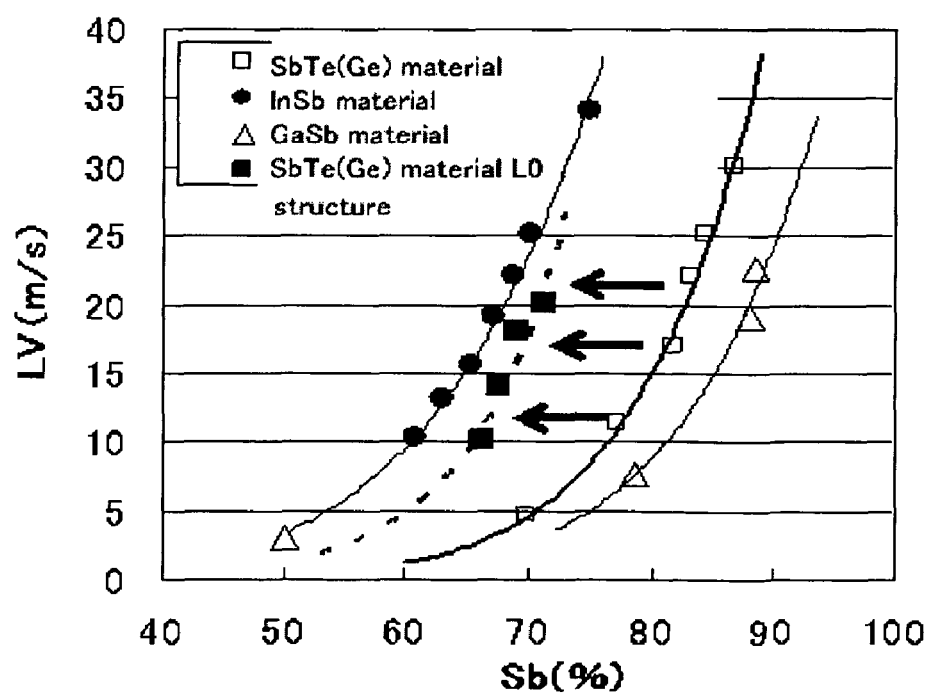
FIG. 10 is a view showing comparison results of transition linear velocities measured with varying the laminar structure of the single layer optical recording media shown in FIG. 8.

Further, the inventors of the present invention reexamined a SbTe eutectic composition containing Ge and having an around 70% content of Sb with which a transition linear velocity on the same level as that of the InSb-based material could be obtained. FIG. 10 shows the results. As shown in FIG. 10, it is found that a SbTe eutectic composition containing Ge and having an around 70% content of Sb can also be used for the material of the first information layer that a high-crystallization rate is required. The material used for the recording layer contains a composition of Sb, Te, and Ge in order of descending content. When the Sb content is near 70%, the range can be said to be a range within which storage reliability is not degraded.

With respect to the materials to be added to GeSbTe, Ag and In may be selected. It is conventionally known that reflectance and initializability can be controlled by adding In to Ag.

As for composition ratio of InSbGe and GeSbTe, various compositions can be considered. As shown in FIG. 8 and FIG. 10, it is possible to vary the recording linear velocity to be used depending on the amount of Sb content. In the case of a two-layered optical recording medium, a first recording layer needs to be made thin in order to obtain transmittance, and when the first recording layer is made thin, the recording linear velocity changes to slow down. Then, the Sb content may be increased or decreased in consideration of the tendency. With respect to the amount of Ge, particularly when Sb is added with a content more than that of a eutectic alloy, Ge tends to serve to prevent the degradation of storage stability, because the redundant amount of Sb tends to degrade storage property. The Ge content is preferably 3.5 atomic % to 10 atomic %, and more preferably 3.5 atomic % to 6 atomic %.

In addition, the thickness of the first recording layer on which recording is performed while irradiating the optical recording medium with a laser beam is preferably 4 nm to 16 nm, and more preferably 6 nm to 10 nm. When the thickness of the first recording layer is less than 4 nm, reproductivity of the thickness thereof is unstable at the time of forming the layer, and when the thickness is more than 16 nm, the recording and reproducing property of the second recording layer may sometimes be remarkably reduced because of the reduced transmittance to less than 20%. When the wavelength range of a laser beam to be used is 453 nm or more, the advantage of a Cu reflective layer can be held, however, from the perspective of merchantability, the range of thickness is preferably used because the thickness range can be applied to the wavelength of DVD, i.e. 660 nm.

Since the second recording layer is not required to have light transmittance property, unlike the first recording layer, the second recording layer preferably has a thickness equivalent to that of a conventional optical recording medium having a single recording layer i.e. 12 nm to 20 nm.

Typically, for the material of the first upper dielectric layer and the second upper dielectric layer, a mixture of ZnS and $SiO_2$ ($ZnS:SiO_2$=80:20 mole %) is used. Since a mixture of ZnS and $SiO_2$ contains sulfur, it causes deterioration due to sulfuration of reflective layers, and so a dielectric layer called as barrier layer or intermediate layer, or a metal layer is disposed. Whereas, when the barrier layer or the intermediate layer has light absorption, there arises a problem with recording and reproducing of information on the information layer disposed at the innermost side as viewed from the light beam irradiation side. Further, it is hard to take a quenching structure in the first information layer during recording because there is no choice but to make the first reflective layer thin, and thus jitter property is hardly obtained during recording. Thus, for materials of the first upper dielectric layer, at least a certain level of thermal conductivity i.e. conductive property is needed, and further materials capable of preventing deterioration of the reflective layers are preferably used. Such materials include materials containing at least a Sn oxide, and a Ta oxide. Each of these oxides is a material which does not accelerate deterioration of reflective layer materials, and the composition ratio of these oxides may be selected depending on the production process, the cost, and the allowable hours for production. When a Sn oxide is contained with a large amount, the required power for recording tends to be increased. The content of Ta oxide is preferably less than 20 mole % because the property is hardly exhibited on the first information layer, although Ta oxide is a material that does not reduce the deposition rate.

By making the information layers have a layer containing a Sn oxide and a Ta oxide, the recording sensitivity can be improved due to improved heat dissipation, and it is possible to take a high modulation degree even with a relatively low-recording power. For other dielectric materials possibly to be added, materials with which transparency can also be secured without impairing thermal conductivity i.e. conductivity are suitable. For example, In oxides or Zn oxides which are used as materials for transparent conductive layers are preferably used. When such a material is used, the light transmittance of the first information layer can be improved, and thus the recording sensitivity of the second information layer can also be improved.

It is preferable that a Sn oxide be contained at 50 mole % or more in the material of the dielectric layer. When the content is less than 50 mole %, a sufficiently high-crystallization rate is hardly obtained at the first recording layer, a high-speed recording as fast as 10 m/s is hardly performed at the first information layer, and jitter of repetitive recording (overwrite jitter) also degrades.

Figure 1:
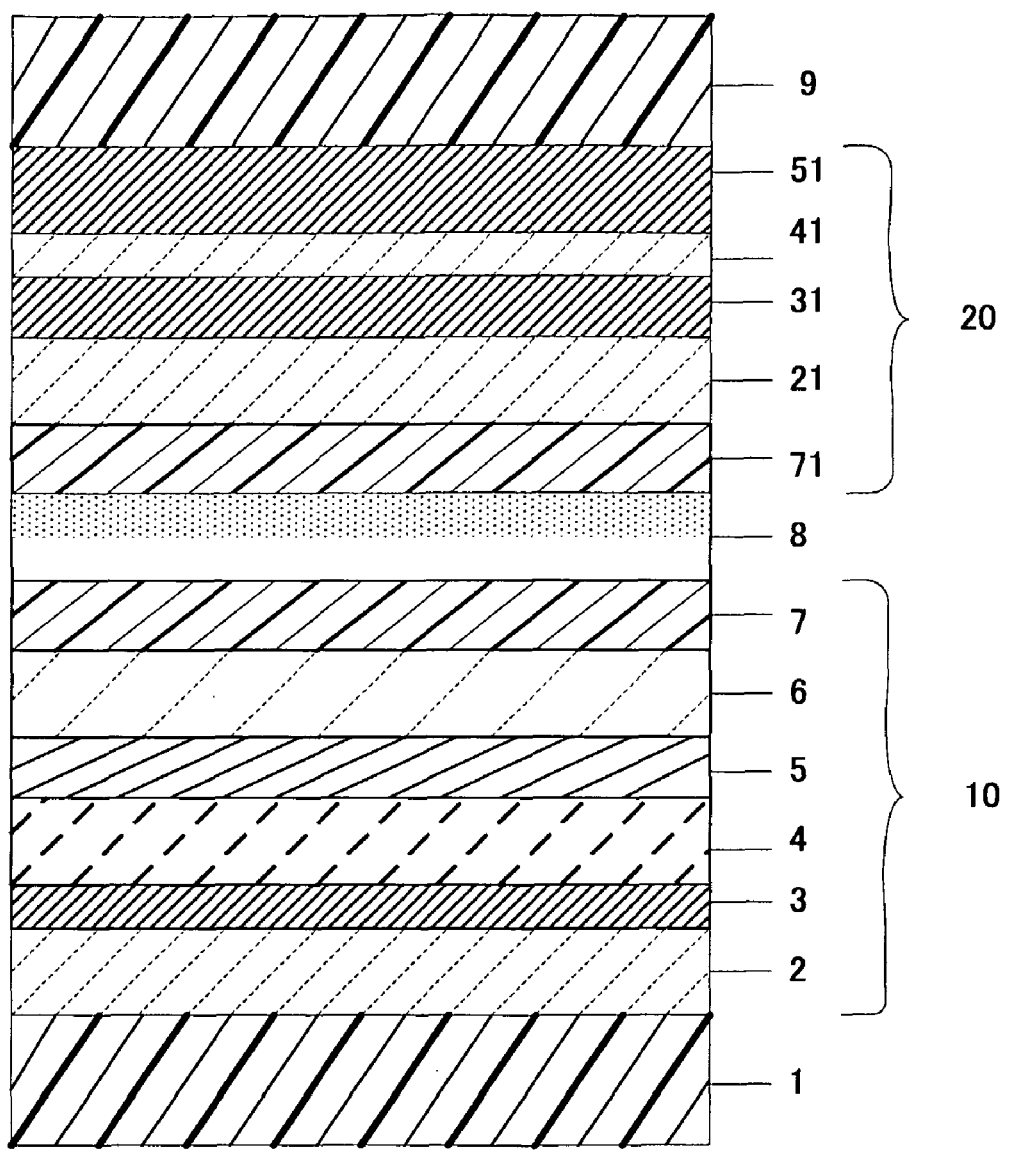
FIG. 1 is a view exemplarily showing a laminar structure of the two-layered optical recording medium of the present invention.

Here, a laminar structure example of the two-layered optical recording medium of the present invention is shown in FIG. 1. In this laminar structure example, first information layer 10 and second information layer 20 are formed in a laminar structure and bonded together through adhesive layer 8. The first information layer 10 is provided with first lower dielectric layer 2, first recording layer 3, first upper dielectric layer 4, first reflective layer 5, inorganic dielectric layer 6, and first environment protective layer 7 each formed on a first substrate 1. The second information layer 20 is provided with second environment protective layer 71, second lower dielectric layer 21, second recording layer 31, second upper dielectric layer 41, second reflective layer 51, and second substrate 9 (substrate for bonding).

However, when the first information layer 10 and the second information layer are prepared almost at the same time, and both of the information layers are immediately bonded together, there is no need to form the environment protective layers 7 and 71. Therefore, the first environment protective layer 7 and the second environment protective layer 71 can be omitted by making the adhesive layer 8 have a thickness with the thicknesses of the first environment protective layer 7 and the second environment protective layer 71 added to the thickness of the adhesive layer 8.

Hereinafter, materials and thicknesses of each of the layers will be described, however, the points that have been mentioned above will be omitted.

Examples of materials of the first substrate include glass, ceramics, and resin, however, a substrate made of resin is preferable in terms of formability and cost performance. Examples of the resin used for the substrate include polycarbonates, acrylic resins, epoxy resins, polystyrene resins, acrylonitrile-styrene copolymer resins, polyethylene resins, polypropylene resins, silicone resins, fluoride resins, ABS resins, and urethane resins. Of these resins, polycarbonate resins, acrylic resins which excel in formability, optical properties, and cost performance are preferable. Generally, a transparent substrate made of a polycarbonate resin with a specific groove formed by an injection molding method as substrates for CD or DVD are often used.

As for the second substrate, materials similar to those of the first substrate can be used, however, the material is not necessarily transparent, because the second substrate is disposed at the side on which the laser beam is not incident.

Examples of materials of the first lower dielectric layer 2 and the second lower dielectric layer 21 include oxides such as SiO, $SiO_2$, ZnO, $SnO_2$, $Al_2O_3$, $TiO_2$, $In_2O_3$, MgO, and $ZrO_2$; nitrides such as $Si_3N_4$, AlN, TiN, BN, and ZrN; sulfides such as ZnS, and $TaS_4$; carbides such as SiC, TaC, $B_4C$, WC, TiC, and ZrC; diamond-like carbons; or mixtures thereof. Of these, a mixture of ZnS and $SiO_2$ (85 mole %:15 mole %), a mixture of ZnS and $SiO_2$ (80 mole %:20 mole %), a mixture of ZnS and $SiO_2$ (75 mole %:25 mole %) or the like are preferable. Particularly for the first dielectric layer which is subjected to thermal damages such as thermal expansion changes, and high-temperature or room temperature changes because of the position being formed between the recording layer and the substrate, a mixture of ZnS and $SiO_2$ (80 mole %:20 mole %), which is believed that the optical constant, the thermal expansion coefficient, and the elastic modulus are optimized, is often used, because importance is placed on thermal properties, optical properties, and the productivity (speedy deposition rate).

The thicknesses of the first lower dielectric layer 2 and the upper dielectric layer 4 significantly affect reflectance, modulation degree, and recording sensitivity, and thus it is desired to select a thickness with which the reflectance of the optical medium can be nearly the minimum value. Within the thickness range, the recording sensitivity is excellent, recording is enabled with a power of which the thermal damage is more reduced, and the overwrite property can be improved. Particularly, in the case of a two-layered optical recording medium, in many cases, a recording power larger than that of a single layer optical recording medium is set, and thus even when a large recording power is applied, the first lower dielectric layer 2 and the upper dielectric layer 4 are respectively required to have a thickness with which the substrate does not suffer from deformation.

Specifically, the thickness of the first lower dielectric layer is preferably 40 nm to 80 nm or 180 nm to 240 nm. The thickness of the first upper dielectric layer is preferably 10 nm to 25 nm.

In addition, the thickness of the second lower dielectric layer is preferably 60 nm to 180 nm. The thickness of the second upper dielectric layer is preferably 10 nm to 25 nm.

As for materials of the inorganic dielectric layer 6, $In_2O_3$, $SnO_2$, and ITO (mixed composition of $In_2O_3$ and $SnO_2$), ZnO or mixtures thereof each of which are typically used for transparent dielectric layers, or materials to which a trace amount of additives such as metal or oxide in an amount of 20 mole % or less are added can be used.

The thickness of the inorganic dielectric layer 6 is preferably 40 nm to 80 nm or 120 nm to 160 nm.

As for materials of the environment protective layers 7 and 71 or the adhesive layer 8, ultraviolet curable resins and thermosetting resins can be used. When a thermosetting resin is used, it may affect the tilt of the substrate. Therefore, typically, ultraviolet curable resins prepared by spin-coating are suitably used. For example, it is possible to use materials containing epoxydi(meth)acrylate and $CH_2$=COOR(R is a cycloaliphatic hydrocarbon residue having 6 to 12 carbon atoms), ethylene unsaturated group contents other than the above noted components, and a photo-polymerization initiator; materials containing epoxydi(meth)acrylate obtained by reacting a bisphenol type epoxy resin with the entire chlorine content of 1,500 ppm or less and a (meth)acrylic acid with a tertiary amine as a catalyst or other acrylates; ultraviolet curable compositions having a pH value of an ultraviolet curable composition (resin) in 1% by mass methanol solution being 4.5 to 6.8 and containing 2-methyl-1-(4-methylthiophenyle)-2-morphorino-propane-1-one in a content of 0.1% by mass to 3% by mass as a photo-polymerization initiator; and the like.

Examples of commercially available materials of the first environment protective layer 7 and the second environment protective layer 71 include overcoat agents such as SD-318 manufactured by Dainippon Ink and Chemicals, INCORPORATED; nopco 134 from NOPCO cure series manufactured by Sunnopco Co., Ltd.

Each thickness of the first environment protective layer 7 and the second environment protective layer 71 is preferably 3 μm to 15 μm. When the first and the second environment protective layers are formed to respectively have a thickness thinner than 3 μm, increases in the number of errors may be observed when only one information layer is formed and left as it is. When the first and the second environment protective layers are made so as to respectively have a thickness thicker than 15 μm, the internal stress is increased, which fairly affects the mechanical properties of the two-layered optical recording medium. In the case of a two-layered optical recording medium, it needs such a distance between a first recording layer and a second recording layer that the first recording layer and the second recording layer are optically separatable from each other, and it is preferred to have the total thickness of the first environment protective layer 7, the second environment protective layer 71, and the adhesive layer 8 being around 55 μm±15 μm when an infrared wavelength of 660 nm is used.

It is necessary that the first environment protective layer 7 and the second environment protective layer 71 be formed in consideration that these environment protective layers are possibly left after the first information layer is formed on the first substrate, or after the second information layer is formed on the second information layer. When the first information layer 10 on the first substrate a and the second information layer 20 on the second substrate 9 are formed substantially at the same time and bonded each other, the adhesive layer 8 using an ultraviolet curable resin or the like may be singly formed provided that a thickness of 55 μm±15 μm is secured for the adhesive layer.

According to the present invention, it is possible to provide a two-layered optical recording medium capable of obtaining sufficient recording properties in a wavelength range of 453 nm or more, particularly in infrared wavelengths of 655 nm±5 nm even on an information layer having high-transmittance being disposed at the front side as viewed from the light beam irradiation side of the two information layers, and assuredly enabling recording and reproducing data signals on an information layer disposed at the innermost side as viewed from the light beam irradiation side.

EXAMPLE

Hereinafter, the present invention will be further described in detail referring to Examples and Comparative Examples, however, the present invention is not limited to the disclosed Examples. Here, the standard evaluation method and standard criteria for phase-change rewritable two-layered DVD media are employed, however, the two-layered optical recording medium of the present invention is not necessarily limited to media having a specific format.

Example 1

First, a recording layer to be disposed at the front side as viewed from the light beam irradiation side (called as a first recording layer) was prepared in the following manner.

On a continuous groove surface of a polycarbonate substrate having a diameter of 120 mm, a thickness of 0.6 mm, and concave-convex formed on the single-side thereon as a tracking guide of continuous groove with a track pitch of 0.74 μm, a first dielectric layer having a thickness of 220 nm, a first recording layer having a thickness of 8 nm, a first upper dielectric layer having a thickness of 12.5 nm, a first reflective layer having a thickness of 8 nm, and an inorganic dielectric layer having a thickness of 140 nm were formed in this order. As for materials of the layers, $ZnS$—$SiO_2$ (80:20 mole %) was used for the first lower dielectric layer; $In_{15}Sb_{80}Ge_5$ was used for the first recording layer; a mixture of $Ta_2O_5$:$Al_2O_3$:$SnO_2$=4:16:80 (mole %) was used for the first upper dielectric layer; Cu:Mo=98.9:1.1 (% by mass) was used for the first reflective layer; IZO [$In_2O_3$:$ZnO$=90:10 (mole %)] was used for the inorganic dielectric layer to form each of the layers by sputtering through the use of a sputtering apparatus having eight chambers manufactured by Balzers (currently, Unaxis Japan Co., Ltd.) using an Ar gas as the sputtering gas. However, the above noted composition ratios of each of the elements or compounds respectively show a ratio of each of the elements or compounds being poured to the target.

Upon completion of forming the inorganic dielectric layer, the laminar structure had a measured transmittance of 39.6%.

Next, on the laminar structure above, a first environment protective layer was formed using a spin-coater to produce a first information layer. The first environment protective layer was made of an ultraviolet curable resin of DIABEAM NH-7617N (manufactured by MITSUBISHI RAYON CO., LTD.) containing epoxydi(meth)acrylate, $CH_2$=$COOR$ (R is a cycloaliphatic hydrocarbon residue having 6 to 12 carbon atoms), ethylene unsaturated group contents other than the above noted components, and a photo-polymerization initiator and had a thickness after being cured of 4 μm.

The first information layer was initialized using an initialization device (initialization device for phase-change optical discs: POP120-3Ra, manufactured by Hitach Systems & Services, Ltd.) by adjusting the focus position to the first recording layer using an adjuster. In the initialization device, a pickup (numerical aperture (NA) of 0.55, spot side of around 1 μm×96 μm±5 μm) of a semiconductor laser in a size of around 1 μm×75 μm±5 μm (emission wavelength of 810 nm±10 nm) was used. The initialization conditions are as follows: the optical recording medium was rotated at CLV (Constant Linear Velocity) of a recording linear velocity of 3 m/s, with a feed rate of 36 μm/revolution, a radius position of 23 mm to 58 mm, and an initialization power of 700 mW.

A second information layer to be disposed at the innermost side as viewed from the light beam irradiation side was produced in the following manner.

On a continuous groove surface of a polycarbonate substrate having a diameter of 120 mm, a thickness of 0.6 mm, and concave-convex formed on the single-side thereof as a tracking guide of continuous groove with a track pitch of 0.74 μm, a second reflective layer having a thickness of 140 nm, a second upper dielectric layer having a thickness of 20 nm, a second recording layer having a thickness of 15 nm, and a second lower dielectric layer having a thickness of 120 nm were formed in this order.

For materials of the layers, $ZnS$—$SiO_2$ (80:20 mole %) was used for the second lower dielectric layer; $Ag_{0.45}In_{4.98}Sb_{68.61}Te_{23.95}Ge_{2.01}$ was used for the second recording layer; a mixture of $Ta_2O_5$:$Al_2O_3$:$SnO_2$=4:16:80 (mole %) was used for the second upper dielectric layer; $Ag_{98}Pd_1Cu_1$ (% by mass) was used for the second reflective layer to form each of the layers by sputtering through the use of a sputtering apparatus having eight chambers manufactured by Balzers (currently, Unaxis Japan Co., Ltd.) using an Ar gas as the sputtering gas.

The above noted composition ratios of each of the elements used for materials of the second recording layer show results of analyzing each of the elements poured in the target by means of Inductively Coupled Plasma Emission Spectrometry. To the second recording layer, a same material as that of the first environment protective layer was applied by spin-coating to form a second environment protective layer to thereby produce a second information layer.

As for the initialization of the second information layer, the same initialization device as used for the first information layer was used, however, since the position of the recording layer on the substrate differed between the first information layer and the second information layer, the focus position was corrected by using a spacer of 0.6 mm being a space of the displacement space. The initialization conditions are as follows: the optical recording medium was rotated at a CLV (Constant Linear Velocity) at a recording linear velocity of 2.0 m/s, with a feed rate of 36 μm/revolution, a radius position of 23 mm to 58 mm similarly to the first information layer, and an initialization power of 600 mW.

Next, the first information layer and the second information layer were bonded together with an ultraviolet curable resin (DVD003, manufactured by Nippon Kayaku Co., Ltd.) to thereby produce a two-layered optical recording medium. The amount of coating and the coating condition were set such that the total thickness of the bonded first environment protective layer, the second environment protective layer, and the adhesive layer was within the range of 55 μm±15 μm.

Recording was performed on the produced two-layered optical recording medium under the following conditions, and then the two-layered optical recording medium was evaluated using an optical disc evaluation system having a pickup with a semiconductor laser based on the following specifications carried thereon (DDU1000, manufactured by PULSTEC INDUSTRIAL CO., LTD., laser wavelength: 660 nm, numerical aperture (NA): 0.65).

Recording linear velocity: 3.5 m/s to 8.4 m/s (CAV)
Recording power (Pw): 40 mW
Erasing power (Pe): 16 mW
Reading power (Pr): 1.4 mW Based on an optimized pulse strategy, recording was performed using a 3 T pattern, and then the initial C/N ratio (Carrier to Noise Ratio) and the C/N ratio after storage for 300 hours under the condition of temperature: 80° C. and relative humidity (RH): 85% were measured. In the result, the initial C/N ratio was 53 dB to 56 dB, the C/N ratio after storage for 300 hours was 50 dB to 53 dB, and the amount of change in C/N ratio was 3 dB. No expression of layer float, layer exfoliation, and speckled discoloration of layer seemed abnormal was observed.

The reflectance was 7.2%, however, the reflectance value was a converted value of the actual measurement value based on a ratio that the signal level of the photo diode at the time when the reflectance of pure Ag formed to have a thickness of 140 nm on a glass plate was read using the same measurement system was determined to have a reflectance of 87.7%.

Next, the optical recording medium was measured at CAV (Constant Angular Velocity) of a radius position of 40 mm and a recording linear velocity of 3.49 m/s. Multitrack recording was performed using 8 T pattern under the recording conditions of Pw=36 mW, and Pe=14 mW. Recorded signals were reproduced under the conditions of Pr=1.4 mW and a recording linear velocity of 3.49 m/s, and then the jitter property was measured. At the center track, a jitter value σ/T of 7.5% was obtained. The jitter after storage for 300 hours under the condition of 80° C. and a relative humidity (RH) of 85% was 8.2% at this track and showed excellent jitter property.

Examples 2 to 10

A two-layered optical recording medium was produced in the same manner as in Example 1 except that the added metal of the first reflective layer and the added amount were changed, and then the first information layer was evaluated in terms of the initial C/N ratio and the C/N ratio after storage for 300 hours.

Table 2 shows the results in addition to the result of Example 1. The results shown in Table 2 exemplified that each of the two-layered optical recording media of the present invention showed an excellent C/N ratio of 45 dB or more both before and after storage.

Comparative Example 1

A two-layered optical recording medium was produced in the same manner as in Example 1 except that the material of the first reflective layer was changed to pure Ag. Upon completion of forming the inorganic dielectric layer, the transmittance was measured, and the transmittance was 34%.

Next, the first information layer was evaluated in the same manner as in Example 1. Recording of 3 T pattern was performed in the same manner as in Example 1 except that the reading power (Pr) was changed to 1.0 mW. Consequently, the initial C/N ratio was 47 dB, the C/N ratio after storage for 300 hours was 40 dB, and the amount of change in C/N ratio was 7 dB. Table 2 shows the result.

In addition, the reflectance was 1% higher than in Example 1.

Comparative Example 2

A two-layered optical recording medium was produced in the same manner as in Example 1 except that the material of the first reflective layer was changed to pure Ag. Upon completion of forming the inorganic dielectric layer, the transmittance was measured, and the transmittance was 40%.

Next, the first information layer was evaluated in the same manner as in Comparative Example 1. Consequently, the initial C/N ratio of 3 T patter was 45 dB to 48 dB, and the C/N ratio after storage for 300 hours was 30 dB to 33 dB. In result, the C/N ratio was lowered by 15 dB. Table 2 shows the result.

TABLE 2

| | Added metal | Added amount (mass %) | C/N (dB) | Amount of change in C/N ratio after storage for 300 hrs (dB) |
|---|---|---|---|---|
| Ex. 1 | Mo | 1.1 | 53-56 | 3 |
| Ex. 2 | Ta | 2.1 | 54 | 3 |
| Ex. 3 | Nb | 1.1 | 52 | 4 |
| Ex. 4 | Zr | 1.0 | 53 | 3 |
| Ex. 5 | Zr | 0.3 | 50 | 5 |
| Ex. 6 | Ni | 0.7 | 52 | 4 |
| Ex. 7 | Cr | 0.6 | 51 | 4 |
| Ex. 8 | Au | 2.2 | 50 | 5 |
| Ex. 9 | Ge | 0.8 | 54 | 3 |
| Ex. 10 | Ge | 0.2 | 50 | 5 |
| Compara. Ex. 1 | Pure Ag | — | 47 | 7 |
| Compara. Ex. 2 | Pure Au | — | 45-48 | 15 |

Examples 11 to 21

A two-layered optical recording medium was produced in the same manner as in Example 1 except that the material of the first reflective layer was changed to Cu—Ta, and the added amount of Ta was changed from 0.2% by mass to 5% by mass, and then the optical recording medium was evaluated in terms of the initial jitter and the jitter after storage for 300 hours.

The amount of change in jitter value between the initial jitter and the jitter after storage for 300 hours was 9% or more, and there was no problem with jitter property. The change in jitter after storage for 300 hours using a small amount of Ta is considered to be caused by the change of the material of the first reflective layer. The increase in the initial jitter with an added amount of Ta of 3% by mass or more seems to be caused by the reduced thermal conductivity of the first reflective layer.

Further, in order to evaluate the transmittance of layers, a single layer was formed with a thickness of 8 nm on a glass plate, and then the transmittance was measured. The results are summarized in Table 3. There was no change in transmittance of the single layer with an added amount of Ta up to 3% by mass, however, when the added amount of Ta was more than 3% by mass, there was a tendency that the transmittance was gradually increased.

Comparative Example 3

A two-layered optical recording medium was produced in the same manner as in Example 1 except that no metal was added to the Cu material of the first reflective layer, and then the optical recording medium was evaluated in the same manner as in Examples 11 to 21. Table 3 shows the results.

In Comparative Example 3, there was no change in transmittance of the single layer, the initial jitter showed excellent result, however, the jitter after storage for 300 hours was drastically increased. The jitter after storing the optical recording medium for 100 hours was 9.5% (increased by 3%), and the jitter after storing the optical recording medium for 300 hours was 10.8% (increased by 4.3%).

Comparative Examples 4 to 6

A two-layered optical recording medium was produced in the same manner as in Example 1 except that the material of the first reflective layer was changed to Cu—Ta, and the added amount of Ta was changed to 5.5% by mass in Comparative Example 4; 6% by mass in Comparative Example 5; and 7% by mass in Comparative Example 6, and each of the optical recording media was evaluated in the same manner as in Examples 11 to 21. Table 3 shows the results.

As can be seen from Table 3, when the added amount of Ta was more than 5% by mass, the transmittance of the single layer was increased in accordance with the increase in the added amount of Ta, and the initial jitter was significantly increased along with the increase in the added amount of Ta. In contrast, the amount of change in jitter after storage for 300 hours was small on the whole.

TABLE 3

|  | Added amount of Ta (mass %) | Transmittance (%) of 8 nm single layer | Initial jitter (%) | Jitter (%) after storage for 300 hrs |
|---|---|---|---|---|
| Compara. Ex. 3 | 0.0 | 74 | 6.5 | 10.8 |
| Ex. 11 | 0.2 | 74 | 6.4 | 9.4 |
| Ex. 12 | 0.5 | 74 | 6.5 | 8.5 |
| Ex. 13 | 1.0 | 74 | 6.5 | 7.5 |
| Ex. 14 | 1.5 | 74 | 6.6 | 7.1 |
| Ex. 15 | 2.0 | 73 | 6.5 | 6.7 |
| Ex. 16 | 2.5 | 72 | 6.7 | 6.8 |
| Ex. 17 | 3.0 | 71 | 6.8 | 7.0 |
| Ex. 18 | 3.5 | 69 | 7.3 | 7.5 |
| Ex. 19 | 4.0 | 66 | 8.2 | 8.6 |
| Ex. 20 | 4.5 | 63 | 8.7 | 9.1 |
| Ex. 21 | 5.0 | 60 | 9.4 | 9.6 |
| Compara. Ex. 4 | 5.5 | 57 | 11.0 | 11.1 |
| Compara. Ex. 5 | 6.0 | 54 | 13.0 | 13.2 |
| Compara. Ex. 6 | 7.0 | 49 | 15.5 | 15.4 |

Examples 22 to 26 and Comparative Examples 7 to 9

First information layers for Examples 22 to 26 and Comparative Examples 7 to 9 were produced in the same laminar structure and with the same materials as in Example 1 except that only the thicknesses of the respective first reflective layers were changed. Then, each of the first information layers was bonded to each of second information layers having the same laminar structure as in Example 1 to thereby produce respective test samples of Examples 22 to 26 and Comparative Examples 7 to 9.

The thickness of the first reflective layer in each of the test samples was 3 nm in Comparative Example 7; 4 nm in Example 22; 6 nm in Example 23; 8 nm in Example 24; 10 nm in Example 25; 12 nm in Example 26; 13 nm in Comparative Example 8; and 15 nm in Comparative Example 9.

Signals of 8 T were recorded on each of these test samples at a recording linear velocity of 7 m/s and an erasing power of 16 mW, and then the erase ratio at the time when the signals were erased was measured. The erase ratio is a value that a ratio between the amplitude of recorded signals before erasing the signals and the amplitude of the recorded signals after erasing the signals is determined, and the ratio is represented by decibel.

Figure 9:
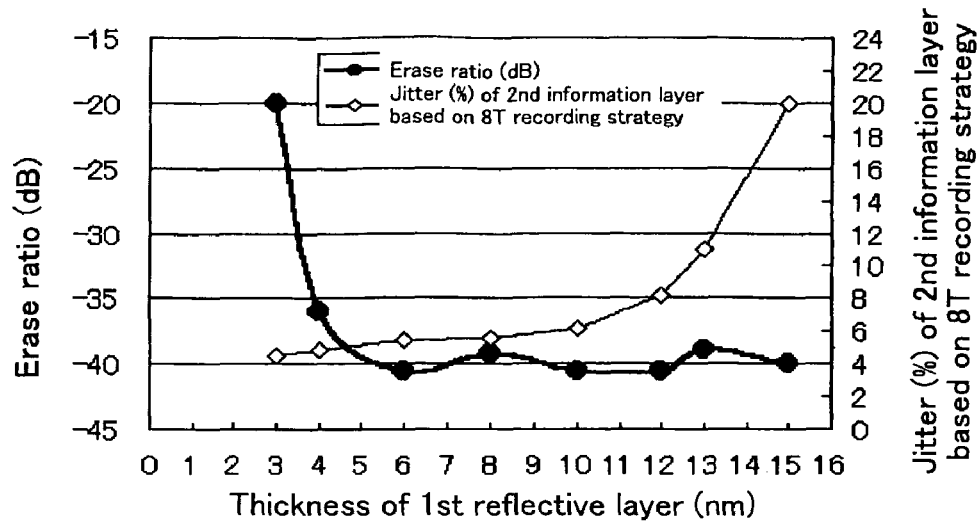
FIG. 9 is a view showing measurement results of erase ratio and jitter property with 8 T of Examples 22 to 26 and Comparative Examples 7 to 9.

FIG. 9 shows the results. With a thickness of the first reflective layer of 6 nm or more, the erase ratio was not drastically changed and was around −40 dB. With a thickness of the first reflective layer of 4 nm, the erase ratio began to be slightly reduced, however, the erase ratio was still −35 dB or less, and this was within the allowable range of erase ratio. However, with a thickness of the first reflective layer of 3 nm, an erase ratio of only −20 dB was obtainable, and some data remained unerased.

Next, with respect to the above test samples, signals of 8 T were recorded on a single track of the second information layer with the laser beam transmitted to the first information layer, and then the recorded signals were produced to measure the jitter of the test samples.

FIG. 9 shows the results. With a thickness of the first reflective layer of 12 nm or less, excellent jitter property of 9% or less was obtainable. However, with a thickness of the first reflective layer of 13 nm or 15 nm, it resulted in a jitter value exceeding 9%.

From the above results, it was found that the thickness of the first reflective layer is preferably 4 nm to 12 nm.

Comparative Examples 10 to 13

Each of two-layered optical recording media for Comparative Examples 10 to 13 was produced in the same manner as in Example 1 except that the material of the first reflective layer was changed to Cu—Al with an Al added amount of 2.1% by mass in Comparative Example 10; changed to Cu—Si with a Si added amount of 2.1% by mass in Comparative Example 11; changed to Cu—Zn with a Zn added amount of 2.1% by mass in Comparative Example 12; and changed to Cu—Pd with a Pd added amount of 2.1% by mass in Comparative Example 13. Recording was performed on each of the optical recording media using a 3 T pattern in the same manner as in Example 1, and changes in C/N ratio after storing each of the recording media for 300 hours were measured. Table 4 shows the results. From the results, it was found that the amount of change in C/N ratio largely varies depending on the type of additives, and there are unsuitable components to be added to Cu even in metals used for materials or additives for reflective layers of optical recording media.

TABLE 4

|  | Added metal | Added amount (mass %) | C/N (dB) | Amount of change in C/N ratio after storage for 300 hrs (dB) |
|---|---|---|---|---|
| Compara. Ex. 10 | Al | 2.1 | 50 | 10 |
| Compara. Ex. 11 | Si | 2.1 | 52 | 15 |
| Compara. Ex. 12 | Zn | 2.1 | 51 | 12 |
| Compara. Ex. 13 | Pd | 2.1 | 48 | 7 |

Example 27

A two-layered optical recording medium was produced in the same manner as in Example 1 except the following conditions were changed. The thickness of the first lower dielectric layer was changed to 60 nm. The material of the first recording layer was changed was changed to Ag:In:Sb:Te:Ge=0.2:3.5:69.2:21.1:6 (atomic %), and the thickness was changed to 7.5 nm. The material of the upper dielectric layer was changed to $Ta_2O_5:SnO_2$=20:80 (mole %), and the thickness was changed to 5 nm. The material of the inorganic dielectric layer was changed to IZO, and the thickness was changed to 60 nm. Each of the layers was formed on a first substrate in this order to thereby form a first information layer. A second information layer same as in Example 1 was produced. Each of the information layers were initialized and then bounded each other.

Recording properties of the first information layer of the optical recording medium of Example 27 were evaluated in the same manner as in Example 1. The initial C/N ratio of 3 T pattern was 53 dB, and the amount of change in C/N ratio between the initial C/N ratio and the C/N ratio after storage for 300 hours under a condition of a temperature of 85° C. and a relative humidity of 85% was 3 dB. Both of the C/N ratios were favorable. No layer float, layer-peeling, and patchy discoloration that seemed abnormal was observed. The reflectance of the first information layer was 6.5%.

Next, at the radius position of 40 mm of the optical recording medium, multi-track recording was performed using 8 T pattern, and the recorded information was reproduced with a reading power of 1.4 mW and at a linear velocity of 3.4 m/s to measure the jitter property. At the center track, the jitter σ/T of 7% was obtained. The jitter of the track after storage for 300 hours under a condition of a temperature of 85° C. and a relative humidity of 85% was 8.0%, and it was possible to obtain favorable jitter property.

The transition linear velocity of the first information layer was measured. Here, the transition linear velocity is defined as a linear velocity at which the reflectance when a continuous laser beam with a power of 15 mW is applied to tracks formed in a crystallized state by performing an initialization with varying the linear velocity of the recording medium begins to change. The transition linear velocity of the first recording layer in the first information layer of Example 27 was 18 m/s. The transition linear velocity is a substitute value of the crystallization rate of the recording layer and gives an important indication of a configuration necessary to achieve an intended recording speed.

Examples 28 to 30

Each of optical recording media was produced in the same manner as in Example 27 except that the composition described in Table 5 was used for the first recording layer of the each of the optical recording media of Examples 28 to 30. The transition linear velocity, the initial jitter during recording multi-tracks using 8 T pattern, and the jitter after storage for 300 hours under a condition of a temperature of 80° C. and a relative humidity of 80% of the each of the optical recording media were shown in Table 5. Even with these compositions for the recording layer, there was no problem with the initial jitter value and the jitter value after storage for 300 hours.

The transition linear velocities measured in Example 27 and Comparative Examples 28 to 30 were plotted in FIG. 10. Each of the transition linear velocities of these optical recording media showed results similar to optical recording media using InSbGe materials.

Comparative Example 14

An optical recording medium was produced in the same manner as in Example 27 except that the material of the first recording layer was changed to GeSbTe. The optical recording medium was evaluated in the same manner as in Example 27. It was impossible to measure the transition linear velocity of the first information layer with the method used in Example 27. The initial jitter value was 16%, and the jitter value was largely increased. The initial jitter property was by no means of satisfactory, although there was no problem with the storage property.

TABLE 5

| | Composition of First Recording Layer | | | | | Transition Linear Velocity | Initial Jitter | Jitter (%) after storage for |
|---|---|---|---|---|---|---|---|---|
| | Ag | In | Ge | Sb | Te | LV (m/s) | (%) | 300 hrs |
| Ex. 27 | 0.2 | 3.5 | 6.0 | 69.2 | 21.1 | 18.0 | 7.0 | 8.0 |
| Ex. 28 | 0.2 | 3.5 | 10.0 | 66.3 | 20.0 | 10.0 | 7.5 | 7.7 |
| Ex. 29 | 0.2 | 3.5 | 7.0 | 67.6 | 21.7 | 14.0 | 7.2 | 7.8 |
| Ex. 30 | 0.2 | 3.5 | 3.5 | 71.4 | 21.4 | 20.0 | 7.2 | 8.5 |
| Compara. Ex. 14 | — | — | 22.2 | 22.2 | 55.6 | — | 16.0 | 16.5 |

The invention claimed is:

1. A two-layered optical recording medium comprising:
a first substrate,
a first information layer,
a second information layer, and
a second substrate,
formed in this order as viewed from a light beam irradiation side,
wherein the first information layer is configured for a recording light beam that is a laser beam having a wavelength in a range of 650 nm to 660 nm, applied through the light beam irradiation side,
the first information layer comprises a first lower dielectric layer, a first recording layer, a first upper dielectric layer, a first reflective layer, and an inorganic dielectric layer formed in this order as viewed from the light beam irradiation side,
the second information layer comprises a second lower dielectric layer, a second recording layer, a second upper dielectric layer, and a second reflective layer formed in this order as viewed from the light beam irradiation side, and
the first reflective layer comprises Cu with a content of 99.8% by mass to 95.0% by mass and one or more metals selected from the group consisting of Ta, Nb, Cr, Ge and Mo and has a thickness of 4 nm to 12 nm.

2. The two-layered optical recording medium according to claim 1, wherein the first information layer and the second information layer are disposed in a laminar structure at an interval where the information layers are optically separatable from each other, and recording can be performed on both of the information layers by means of laser beam irradiation from the same direction.

3. The two-layered optical recording medium according to claim 1, wherein the first substrate is transparent.

4. The two-layered optical recording medium according to claim 1, wherein the first reflective layer comprises Cu with a content of 99.8% by mass to 97.0% by mass and one or more metals selected from the group consisting of Ta, Nb, Cr, Ge and Mo.

5. The two-layered optical recording medium according to claim 1, wherein the first reflective layer has a thickness of 6 nm to 12 nm.

6. The two-layered optical recording medium according to according to claim 1, wherein at least one of the first recording layer and the second recording layer comprises a phase-change recording material containing In, Sb, and Ge.

7. The two-layered optical recording medium according to according to claim 1, wherein at least one of the first recording layer and the second recording layer comprises a phase-change recording material containing Sb, Te, and Ge in descending content.

8. The two-layered optical recording medium according to according to claim 6, wherein the content of Ge is 3.5 atomic % to 10 atomic %.

9. The two-layered optical recording medium according to claim 1, wherein the first recording layer has a thickness of 4 nm to 16 nm.

10. The two-layered optical recording medium according to claim 1, wherein the first upper dielectric layer comprises a Ta oxide, and a Sn oxide.

11. The two-layered optical recording medium according to claim 1, wherein each of the first lower dielectric layer and the second lower dielectric layer comprises a mixture of ZnS and $SiO_2$.

12. The two-layered optical recording medium according to according to claim 7, wherein the content of Ge is 3.5 atomic % to 10 atomic %.

13. The two-layered optical recording medium according to according to claim 1, wherein the first information layer including the first reflective layer has a transmittance that is 60% or higher, when the applied light beam has a wavelength in a range of 650 nm to 660 nm.

14. The two-layered optical recording medium according to according to claim 1, wherein the first information layer including the first reflective layer has a C/N (carrier to noise) ratio that is 45 dB or more, when the applied light beam has a wavelength in a range of 650 nm to 660 nm.

15. The two-layered optical recording medium according to according to claim 1, wherein the first information layer including the first reflective layer, after 300 hours of storage, has a change in C/N (carrier to noise) ratio that is 5 dB or less, when the applied light beam has a wavelength in a range of 650 nm to 660 nm.

16. The two-layered optical recording medium according to according to claim 1, wherein the first information layer including the first reflective layer has a transmittance that is in a range of 60% to 70%, when the applied light beam has a wavelength in a range of 650 nm to 660 nm.

17. The two-layered optical recording medium according to according to claim 1, wherein the first information layer including the first reflective layer has a C/N (carrier to noise) ratio that is in a range of 50 dB to 60 dB, when the applied light beam has a wavelength in a range of 650 nm to 660 nm.

18. A two-layered optical recording medium comprising:
a first substrate,
a first information layer,
a second information layer, and
a second substrate formed in this order as viewed from a light beam irradiation side,
wherein the first information layer is configured for a recording light beam that is a laser beam having a wavelength in a range of 650 nm to 660 nm, applied through the light beam irradiation side,
the first information layer comprises a first lower dielectric layer, a first recording layer, a first upper dielectric layer, a first reflective layer, and an inorganic dielectric layer formed in this order as viewed from the light beam irradiation side,
the second information layer comprises a second lower dielectric layer, a second recording layer, a second upper dielectric layer, and a second reflective layer formed in this order as viewed from the light beam irradiation side,
the first reflective layer comprises Cu with a content of 99.8% by mass to 95.0% by mass and one or more metals selected from the group consisting of Ta, Nb, Zr, Ni, Cr, Ge, Au, and Mo and has a thickness of 4 nm to 12 nm, and
the first upper dielectric layer consists of a Ta oxide, an Al oxide and a Sn oxide.

19. A two-layered optical recording medium comprising:
a first substrate,
a first information layer,
a second information layer, and
a second substrate formed in this order as viewed from a light beam irradiation side,
wherein the first information layer is configured for a recording light beam that is a laser beam having a wavelength in a range of 650 nm to 660 nm, applied through the light beam irradiation side,
the first information layer comprises a first lower dielectric layer, a first recording layer, a first upper dielectric layer, a first reflective layer, and an inorganic dielectric layer formed in this order as viewed from the light beam irradiation side,
the second information layer comprises a second lower dielectric layer, a second recording layer, a second upper dielectric layer, and a second reflective layer formed in this order as viewed from the light beam irradiation side, and
the first reflective layer comprises Cu with a content of 99.8% by mass to 95.0% by mass and one or more metals selected from the group consisting of Ta and Mo and has a thickness of 4 nm to 12 nm.

* * * * *